2,891,022
PHENYLPHENOL-FORMALDEHYDE RESIN ESTERS

David Aelony, Minneapolis, Minn., assignor to General Mills, Inc., a corporation of Delaware No Drawing. Application April 19, 1955
Serial No. 502,527

14 Claims. (Cl. 260—19)

The present invention relates to esters of ortho- and para-phenylphenol-formaldehyde resins. More particularly the present invention relates to esters of para-phenylphenol and ortho-phenylphenol-formaldehyde resins and higher unsaturated fatty acids, such as those derived from drying oils or semi-drying oils. The esters are generally liquid drying oils which dry rapidly to yield hard, tough, resilient films. The films are resistant to hot and cold water and display phenomenal resistance to aqueous alkali.

It is therefore an object of the present information to provide novel unsaturated higher fatty acid esters of ortho-phenylphenol and para-phenylphenol-formaldehyde resins of a particular type.

It is another object of the present invention to provide novel esters of the above type which are capable of drying to hard, tough, resilient films displaying good resistance to hot and cold water and aqueous alkali.

The resins employed in the present invention are derived from formaldehyde and ortho- or para-phenylphenol or mixtures thereof. On an average they contain from 3 to about 15 phenolic groups in the resin molecule, and are substantially free from volatile materials, and particularly from residual phenol and low molecular weight condensation products, such as the condensation products containing 2 phenolic nuclei. The resins are preferably prepared by the acid catalyzed condensation of ortho- or para-phenylphenol and formaldehyde.

The resins may be prepared by condensing para- or ortho-phenylphenol and formaldehyde in the presence of an acid catalyst, such as oxalic acid, hydrochloric acid, and the like. The resinification reaction may be carried out at atmospheric pressure or at super-atmospheric pressure. It is preferred to carry out the resinification reaction under pressure at temperatures of approximately 160° C., as the reaction proceeds at a greatly accelerated rate at this temperature. Time periods of from ½ to 20 hours at 160° C. are suitable for producing resins for the present purposes, when a relatively weak acid, such as oxalic acid, is employed as the catalyst. When a strong catalyst, such as HCl, is employed, the time required for the resin formation may be reduced accordingly.

After the resinification reaction the resin is subjected to a stripping process for the purpose of removing volatile materials, such as excess phenol and lower molecular weight condensation products such as condensation products containing 2 phenolic nuclei. This stripping operation may conveniently be carried out by distilling the more volatile materials from the resin. For example, suitable stripped resins may be prepared by heating the resin until a temperature of at least 250° C., and preferably within the range of 270-310° C., is attained at an absolute pressure of 1-5 mm. of mercury.

The resins thus obtained are hard, brittle resins of light color. They are insoluble in fatty oils and fatty acids. The resins most useful in the present invention have a viscosity ranging from approximately 4 to 20 centistokes in a 30% solution by weight in dimethyl formamide. This viscosity is determined as follows: A filtered 30% solution by weight of the resin in dimethyl formamide is tested in the Ostwald-Fenske S300 viscosimeter at 30° C. using 10 cc. of the solution. The time thus obtained is compared with the time and viscosity of a National Bureau of Standards standard sample oil K-5 to determine the viscosity of the 30% solution of the resin in accordance with the formula:

$$\text{Viscosity in centistokes} = \frac{t_x}{d_s t_s} \cdot \eta_s \cdot 100$$

where $t_x$=time of efflux for polymer solution
$d_s$=density of standard
$t_s$=time of efflux of standard
$\eta_s$=absolute viscosity of standard, in poises The efflux times varied from 20 to 75 sec. with the viscosimeter employed.

The resins above described are esterified with unsaturated higher fatty acids containing from 8 to 22 carbon atoms. These fatty acids may be single isolated fatty acids or mixtures of fatty acids derived from drying or semi-drying oil, or any selected fraction of the mixed acids of a drying oil or semi-drying oil. Typical drying oil and semi-drying oil acids include those from soybean oil, linseed oil, tung oil, perilla oil, oiticica oil, sunflower oil, safflower oil, menhaden oil, and the like. The acids employed for esterification should have an iodine number of at least 100, and preferably at least 110.

The esterification may be carried out by simply heating the resin and fatty acids at a temperature of from about 200–275° C. Esterification catalysts in general may be employed, but it is preferred to employ triphenyl phosphite as the esterification catalyst. The time required for esterification varies widely, depending upon the conditions, but in general, from 2 to about 10 hours is sufficient to effect a desired degree of esterification. In order to speed up the esterification reaction it is preferred to employ an excess of fatty acids over the theoretical quantity of fatty acids necessary for complete esterification. The excess fatty acids may then be stripped off by vaporization after the esterification is substantially complete. The employment of an excess of fatty acids not only speeds up the reaction, but also prevents undue polymerization of the fatty acids during esterification by reducing the time period during which the fatty acids are subjected to the elevated temperature. When less than complete esterification is desired, the excess hydroxyl groups speed up the reaction.

After esterification has been carried on to the extent desired, the reaction mixture is subjected to a vacuum of, for example, about 1–5 mm. of mercury absolute pressure at temperatures ranging from 260–275° C. This results in the removal of virtually all unesterified fatty acids and also removes other volatile material.

The resins of the present invention are esterified from 50 to 100% by means of the unsaturated higher fatty acids. The particular range of esterification employed depends upon the application to which the esters are to be put. For certain metal primers a degree of esterification within the range of 50 to 70% is found to be preferred. For other applications higher degrees of esterification on up to complete esterification are preferred.

The esters preferably have relatively low acid numbers; usually an acid number as low as 30 is desired and usually an acid number below 20 or even below 10 is preferred. This low acid number may be attained in various ways. Thus, where a relatively low degree of esterification is to be obtained the esterification may be carried out with about 50 to 80% of the quantity of free fatty acids which would be required for complete esterification. Under these circumstances, practically all of the free fatty acid may react with the resin and produce an ester of about 50 to 80% esterification and at the same time the ester has a very low acid number. In other instances, especially where the higher degrees of esterification are desired, it is preferred to employ an excess of the acid and then after the desired degree of esterification has been obtained, the excess acid may be removed by stripping. This stripping may involve subjecting the ester to a vacuum of, for example, about 1 to 5 mm. of mercury absolute pressure at a temperature ranging from 260 to 275° C. This results in the removal of virtually all unesterified fatty acids and also removes any other volatile material which may be present. It is apparent that this method of stripping may likewise be applied to lower degrees of esterified resins if desired.

The products of the present invention may be simple fatty acid esters of the phenolic resins or may be mixed fatty and rosin acid esters of the resins. It has been discovered that when a mixture of rosin acids and fatty acids is used for esterification the esters obtained are superior in drying rates and the films obtained are superior in hardness and in alkali resistance. Of the total esterified acids from 10 to 40% may be rosin acid with the preferred range of rosin acids being from 15 to 30%. Any source of rosin acids may be employed. However, for the sake of economy, it is preferred to employ a commercially available product which is the rosin acid fraction resulting from the fractional distillation of the acids of tall oil. This rosin acid fraction may contain from 60 to 80% of rosin acids with the balance being predominantly higher fatty acids, mostly unsaturated. The rosin acid fraction also contains a minor quantity of unsaponifiable materials. The fatty acid content of the rosin acid fraction should be taken into account in bringing the rosin acid content of a mixed acid into the range referred to above. In calculating the polymerizability index as hereinafter described the rosin acids need not be taken into account.

The esters which are suitable for the present invention are those which have a polymerizability index ranging from 100 to 600. The polymerizability index is an indication of the molecular weight of the resin employed as well as the polymerizability of the fatty acids employed for esterification. The polymerizability index is defined as the mathematical product of the viscosity in centistokes at 30° C. of a 30% solution by weight of the resin in dimethyl formamide as previously described, and the viscosity in centistokes obtained on a bodied sample of the fatty acids to be employed for esterification.

The method of determining the viscosity of the bodied fatty acids is as follows: 500 grams of the fatty acids to be employed for esterification are heated to a temperature of 260° C. under nitrogen and held at that temperature for 7 hours. The bodied fatty acids are then cooled to 40° C. before being contacted with the atmosphere. The viscosity is then determined at 40° C. in the Ostwald-Fenske S300 viscosimeter using 10 cc. of the acids. The viscosity of these acids is determined by comparison with a standard in the manner previously described. In general, the viscosities of the bodied acids range from 23 to 92 centistokes.

It should be pointed out that the acids used for esterification are not bodied. The bodying of a sample of the acids before determination of viscosity is for the purpose of determining the extent to which polymerization of the fatty acid groups occurs during the high temperature esterification. The viscosity of the bodied acids indicates the extent to which the fatty acid component of the product contributes to gelation tendencies. The viscosity of the resin indicates the extent to which the resin component of the product contributes to gelation tendencies.

When the mathematical product of the resin viscosity and the bodied acids viscosity (the polymerizability index) falls within the range of 100 to 600, the resin esters are found to possess the desirable properties previously described. When this polymerizability index substantially exceeds 600, the resin ester is likely to be an insoluble gel or is likely to set to an insoluble gel readily during application or use. Frequently when it is attempted to prepare a product having a polymerizability index in excess of 600, an insoluble gel may form during the esterification reaction. When the polymerizability index is below 100, the product is found to be of too low molecular weight and is decidedly inferior in properties, particularly in alkali stability. A preferred range of polymerizability indices is from 140 to 560.

In general the products of the present invention are characterized by exceptional stability toward aqueous alkali. This has been determined by exposing dried films of the resin esters to 5% aqueous sodium hydroxide at room temperature for extended periods of time. In general the products are stable to 5% aqueous sodium hydroxide for at least 2 hours. Some of the products have not failed in 5% aqueous sodium hydroxide even at exposure to the solution for 20 days or more. The alkali stability is determined by coating the compositions on test tubes, allowing the tubes to dry for 3 days and then exposing the films to the alkali. At intervals the test tubes are removed from the alkali solution and the film is rubbed between the fingers to determine whether or not it has softened enough or lost adhesion enough to fail. For purposes of comparison it may be stated that high quality alkyd resins fail in 5% aqueous alkali in as short a period of time as 20–30 min.

In addition to the straight vacuum stripping of the resin and resin esters, other ways of removing the volatile material may be employed. These methods include steam distillation of the volatile material, solvent extraction, as for example with methanol, and in general any known method of removing low molecular weight volatile material from polymeric material.

Acid catalyzed resins are preferred for the present invention because the condensation proceeds readily to relatively high molecular weight. In addition, the acid catalyst may be removed usually by vaporization without any necessity of washing the resin. Alkali catalyzed resins usually are of lower molecular weight initially and contain methylol groups. It is necessary to carry out the reaction further to convert the methylol groups to methylene bridges and thus increase the molecular weight of the resin. Furthermore, removal of the catalyst usually involves washing of a solution of the resin with an aqueous acid which is a cumbersome operation. Notwithstanding these difficulties, alkali catalyzed resins may be made if desired, possessing the properties described and may be used in the present invention.

*Example 1*

1200 grams of ortho-phenylphenol, 553 g. of 37% formalin solution and 22.4 g. of oxalic acid dihydrate were placed in a one gallon stainless steel autoclave. The autoclave was sealed and the temperature raised to 160° C. and held at that temperature for approximately 1 hour. The autoclave was then cooled and opened, and the product removed.

1712 grams of the crude reaction mixture were stripped to 310° C. at 1.2 mm. There was a rapid evolution of gas at 190° C. which necessitated reducing the vacuum and heat. When foaming subsided, full heat and vacuum were reapplied. The non-aqueous distillate weighed 210 g.; the residue weighed 1020 g. A 30% solution of the residue in dimethyl formamide had a viscosity of 5.12 centistokes and a hydroxyl number of approximately 360.

182 grams of the above resin, 350 g. of soybean oil fatty acids (viscosity of bodied sample 24.65 centistokes), 4 g. triphenyl phosphite, and 50 cc. of xylene were refluxed and agitated under a Stark and Dean tube for 4 hours at 260° C. By that time 17.8 cc. out of a theoretical 18 cc. of water required for complete esterification, were obtained. The product was stripped to 260° C. at 60μ. 30 g. of the residue were mixed with 20 g. of mineral spirits and 3 cc. of a solution containing 3% Pb and .6% Co as naphthenates were added. In this and the following examples a solution thus obtained was applied to plates and tubes and the films allowed to dry. The properties of the films are reported in the table appearing after the examples.

Example 2

182 grams of the resin of Example 1, 350 g. of linseed acids (viscosity of bodied sample 43.29 centistokes) 4 g. triphenyl phosphite, and 50 cc. of xylene were refluxed and agitated under a Stark and Dean tube at 260° C. for 4 hours, during which time a quantity of water equivalent to 100% of esterification was obtained. The product was stripped to 260° C. at 75μ to remove unreacted fatty acids.

Example 3

182 grams of the resin of Example 1, 350 g. of dehydrated castor oil acids (viscosity of bodied sample 70.33 centistokes), 4 g. of triphenyl phosphite, and 50 cc. of xylene were refluxed and agitated under a Stark and Dean tube for 3 hours 40 minutes at 260° C., at which time a quantity of water equivalent to complete esterification had been obtained. The product was stripped to 260° C. at 75μ to remove unreacted fatty acids.

Example 4

182 grams of the resin of Example 1, 224 g. of soybean oil fatty acids of Example 1, 4 g. triphenyl phosphite, and 50 cc. of xylene were refluxed and agitated under a Stark and Dean tube at 260° C. for 5 hours, at which time a quantity of water equivalent to 97% esterification based on the quantity of fatty acids employed, was obtained. The quantity of acids employed was sufficient to esterify 80% of the hydroxyl groups of the resin. The product was stripped to 260° C. at 50μ to remove unreacted fatty acids.

Example 5

1200 grams of ortho-phenylphenol, 453 g. of 30% formalin, 22.34 g. of oxalic acid dihydrate were added to a one gallon Monel autoclave equipped with a stirrer. The autoclave was closed and heated to approximately 160° C. for approximately 5 hours, after which the autoclave was cooled and opened. The product was removed and evaporated first under water pump vacuum, and then finally stripped to 310° C. at 700μ. The residue had a melting point of 148-150° C., a hydroxyl number of 309. A 30% solution in dimethyl formamide had a viscosity of 13.25 centistokes.

182 grams of the above resin, 350 g. of soybean oil fatty acids of Example 1, 3 g. triphenyl phosphite, 50 cc. of xylene were refluxed and agitated under a Stark and Dean tube at 260° C. for 5 hours, during which time a quantity of water equivalent to complete esterification had been obtained. The product was stripped to 260° C. at 55μ to remove excess fatty acids.

Example 6

200 pounds of ortho-phenylphenol, 92½ pounds of 37% formalin, 2.7% of oxalic acid dihydrate were placed in an autoclave; the autoclave was closed and heated to a temperature of 160° C. for 15 hours. Thereafter the product was stripped to 252° C. at 5 mm. A portion of this resin was then further stripped to 310° C. at 850μ. The stripped material had a melting point of 136-138° C., a hydroxyl number of 335.4. A 30% solution in dimethyl formamide had a viscosity of 8.73 centistokes.

182 grams of the resin stripped to 310° C., 350 g. of soybean oil fatty acids of Example 1, 4 g. of triphenyl phosphite, and 50 cc. of xylene were refluxed and agitated under a Stark and Dean tube at 260° C. for 7 hours, after which time about 97% of the theoretical quantity of water required for complete esterification was obtained. The product was then stripped to 260° C. at 420μ to remove the excess fatty acids.

Example 7

A resin was prepared as described in the preceding example with the exception of the reaction temperature of 160° C. was maintained for 7 hours. The product was then stripped to a temperature of 310° C. at 800μ. The residue melted at 115-116° C. and had a hydroxyl number of 342.8. A 30% solution in dimethyl formamide had a viscosity of 6.18 centistokes.

182 grams of the above resin, 350 g. of soybean oil fatty acids of Example 1, 4 g. of triphenyl phosphite, and 50 cc. of xylene were refluxed and agitated under a Stark and Dean tube at 260° C. for 5 hours, during which time the quantity of water equivalent to 100% esterification had been obtained. The product was stripped to 275° C. at 150μ to remove unreacted fatty acids.

Example 8

182 grams of the resin in Example 7, 350 g. of linseed oil fatty acids of Example 2, 4 g. triphenyl phosphite, 50 cc. of xylene were refluxed and agitated under a Stark and Dean tube at 260° C. for 5 hours, during which time 97.2% of the theoretical quantity of water required for complete esterification had been obtained. The product was stripped to 260° C. at 80μ to remove unreacted fatty acids.

Example 9

182 grams of the resin of Example 7, 250 g. of dehydrated castor oil fatty acids of Example 3, 4 g. of triphenyl phosphite, and 50 cc. of xylene were refluxed and agitated under a Stark and Dean tube at 260° C. for 5 hours, during which time a quantity of water equivalent to complete esterification had been obtained. The product was stripped to 260° C. at 250μ to remove unreacted fatty acids.

Example 10

1200 grams of para-phenylphenol, 550 g. of 37% formalin, 11.2 g. of oxalic acid dihydrate, were placed in a Monel autoclave. The autoclave was sealed and heated to 160° C. for approximately 1 hour, after which the autoclave was cooled and the product was removed. 1604 g. of this crude material was stripped to 310° C. at 1 mm. The residue had a melting point of 156-157° C. and a hydroxyl number of 378.7. The viscosity of a 30% solution of this resin in dimethyl formamide was 9.45 centistokes.

182 grams of the above resin, 350 g. of soybean oil fatty acids of Example 1, 4 g. triphenyl phosphite, and 50 cc. of xylene were refluxed and agitated under a Stark and Dean tube at 260° C. for 7 hours. At the end of this time a quantity of water equivalent to 95% of complete esterification was obtained. The product was stripped to 260° C. at 40μ. A solution was prepared as previously described in Example 1, but the solution set to a thermoplastic gel while still warm. Accordingly it was applied as films on tubes and plates in a sufficiently warm condition that the solution was liquid.

Example 11

1200 grams of para-phenylphenol, 550 g. of 37% formalin, 11.2 g. of oxalic acid dihydrate were placed in a Monel autoclave and the autoclave closed. The reaction mixture was then heated to approximately 160° C. for ½ hour, after which the reaction mixture was cooled and removed from the autoclave. 1717 g. of this crude reaction mixture was stripped to 310° C. at 1½ mm. The resin had a melting point of 137-138° C. and a hydroxyl number of 337.7. A 30% solution of this resin in dimethyl formamide had a viscosity of 7.51 centistokes.

182 grams of the above resin, 350 g. of soybean oil fatty acids of Example 1, 4 g. triphenyl phosphite, and 50 cc. of xylene were refluxed and agitated under a Stark and Dean tube at 260° C. for 5 hours, during which time a quantity of water equivalent to 100% esterification was obtained. The product was stripped to 260° at 50μ to remove unreacted fatty acids.

Example 12

182 grams of the resin in Example 11, 350 g. of linseed oil acids of Example 2, 4 g. triphenyl phosphite, 50 g. of xylene were refluxed and agitated under a Stark and Dean tube at 260° C. for 4 hours, during which time a quantity of water equivalent to 95% esterification was obtained. The product was stripped to 260° C. at 50μ to remove unreacted fatty acids.

Example 13

182 grams of the resin of Example 11, 350 g. of dehydrated castor oil fatty acids of Example 3, 4 g. triphenyl phosphite, 50 cc. of xylene were refluxed and agitated under a Stark and Dean tube at 260° C. for 3 hours, during which time the theoretical quantity of water required for complete esterification was obtained. The product was stripped to 260° C. at 50μ to remove unreacted fatty acids.

product had a melting point of 107–111° C., a hydroxyl number of 365.8 as compared with a melting point of 86–88° C., and a hydroxyl number of 370.5 for the unstripped commercial resin. A 30% solution in dimethyl formamide had a viscosity of 5.14 centistokes.

182 grams of the above stripped resin, 350 g. of soybean oil fatty acids of Example 1, 4 g. triphenyl phosphite, and 50 cc. of xylene were refluxed and agitated under a Stark and Dean tube at 260° C. for 8 hours, during which time approximately the quantity of water required for complete esterification was obtained. The product was then stripped to 275° C. at 650μ to remove unreacted fatty acids.

Example 15

182 grams of the stripped resin of Example 14, 350 g. of dehydrated castor oil fatty acids of Example 3, 4 g. triphenyl phosphite, 50 cc. of xylene were refluxed and agitated under a Stark and Dean tube at 260° C. for 3 hours, during which time approximately the theoretical quantity of water required for complete esterification was obtained. The product was stripped to 260° C. at 0.6 mm. to remove unreacted fatty acids.

| Example # | 1 | 2 | 3 | 4 | 5 | 6 | 7 | 8 |
|---|---|---|---|---|---|---|---|---|
| M.P., Resin, °C | 95–7 | 95–7 | 95–7 | 95–7 | 148–150 | 136–138 | 115–116 | 115–116. |
| Visc. Resin | 5.12 | 5.12 | 5.12 | 5.12 | 13.25 | 8.73 | 6.18 | 6.18. |
| Acids | Soy | Linseed | Castor | Soy | Soy | Soy | Soy | Linseed. |
| Visc. bodied acid | 24.65 | 43.29 | 70.33 | 24.65 | 24.65 | 24.65 | 24.65 | 43.29. |
| Poly. Index | 125.6 | 221.6 | 360.0 | 125.6 | 325.3 | 214.0 | 151.7 | 267.7. |
| Hrs. Ester | 4 | 4 | 3.67 | 5 | 5 | 7 | 5 | 5. |
| Acid # | 3 | 4.5 | 5.4 | 4.2 | 5.4 | 8.4 | 3.4 | 9.5. |
| OH # | 0 | 6.5 | 16.6 | 14.6 | 0 | 35.0 | 12.0 | 16.3. |
| Tack free to foil, hrs | | | 5½ | | 4 | 4 | | 6. |
| Hard 24 hrs | 10 | 28 | 26 | 10 | 16 | 2 days, 20 | 12 | 28. |
| Hard 7 days | 16 | 36 | 36 | 20 | 24 | 24 | 20 | 38. |
| 5% NaOH | <5 hrs | 24 hrs | 2 days | 2 hrs | OK | 13 days | 2 days | 14 days. |
| Boil. H₂O, 2 hrs | Etched | OK | OK | blush but recovered | OK | OK | OK | OK. |
| Cold H₂O, 3 days | OK | OK | OK | sl. blush | blush but recovered | OK | OK | OK. |

| Example # | 9 | 10 | 11 | 12 | 13 | 14 | 15 |
|---|---|---|---|---|---|---|---|
| M.P., Resin, °C | 115–116 | 156–157 | 137–138 | 137–138 | 137–138 | 107–111 | 107–111. |
| Visc. Resin | 6.18 | 9.45 | 7.51 | 7.51 | 7.51 | 5.14 | 5.14. |
| Acids | Castor | Soy | Soy | Linseed | Castor | Soy | Castor. |
| Visc. bodied acid | 70.33 | 24.65 | 24.65 | 43.29 | 70.33 | 24.65 | 70.33. |
| Poly. Index | 434.8 | 232.9 | 185.6 | 326.0 | 529.6 | 126.7 | 366.6. |
| Hrs. Ester | 5 | 7 | 5 | 4 | 3 | 8 | 3. |
| Acid # | 11.5 | 7.8 | 5.1 | 9.4 | 8.2 | 5.3 | 9.1. |
| OH # | 27.2 | 17.5 | 0 | 0 | 0.9 | 0 | 13.7. |
| Tack free to foil, hrs | 6 | | 6 | 4 | 5 | | 5½. |
| Hard 24 hrs | 20 | 26 | 16 | 2 days, 26 | 2 days, 22 | 10 | 2 days, 28. |
| Hard 7 days | 26 | | 28 | 36 | 28 | 10 | 13 days. |
| 5% NaOH | 22 days | 2 days | 14 days | | | 4 hrs | sl. etched, recovered. |
| Boil. H₂O, 2 hrs | OK | OK | Blush but recovered | OK | OK | Etched and broken | OK. |
| Cold H₂O, 3 days | OK | 5 days, OK | Blush but recovered | OK | OK | 4 days, OK | OK. |

Example 14

A commercial para-phenylphenol-formaldehyde resin (BR 254) was stripped to 310° C. at 600μ. 4.8% of the material was removed by stripping. The stripped To demonstrate the effect of rosin acids in the esterified mixture a series of resins were esterified with varying mixtures of fatty acids and rosin acids and the properties of the resultant compositions observed. The results are indicated in the following table:

| Product | Visc. Resin | Percent Fatty Acids | Percent Rosin Acid | Poly. Index | Hours ester. | Acid No. | OH No. | Tack free, hrs. | Hardness 24 hrs. | Hardness 7 days | 5% NaOH |
|---|---|---|---|---|---|---|---|---|---|---|---|
| A | 6.18 | Soy 100 | 0 | 152.3 | 5 | 3.4 | 12.0 | <7 | 12 | 20 | 2 days. |
| B | 6.18 | Soy 80 | 20 | 152.3 | 6 | 4.8 | 0 | <7 | 20 | 30 | 24 hrs. |
| C | 6.18 | Soy 70 | 30 | 152.3 | 6 | 5.4 | 4.9 | <7 | 32 | 40 | 24 hrs. |
| D | 6.18 | Castor 80 | 20 | 434.6 | 5 | 9.6 | 3.4 | 3¼ | 26 | 36 | 3 days. |
| E | 6.18 | Castor 70 | 30 | 434.6 | 5 | 10.0 | 0 | 2½ | 34 | 54 | 3 days. |
| F | 7.67 | Soy 80 | 20 | 183.1 | 7 | 5.6 | 0 | <7 | 24 | 32 | 24 hrs. |
| G | 7.67 | Soy 70 | 30 | 183.1 | 7½ | 6.7 | 0 | 5½ | 24 | 38 | 24 hrs. |
| H | 7.67 | Castor 80 | 20 | 539.4 | 6 | 9.6 | 17.1 | 2 | 30 | 38 | 10 days. |
| I | 7.67 | Castor 70 | 30 | 539.4 | 6 | 11.2 | 40.7 | | 28 | 30 | 8 days. |
| J | 8.15 | Soy 100 | 0 | 200.9 | 6 | 5.7 | 22.13 | 5¾ | 12 | 12 | 24 hrs. |
| K | 8.15 | Soy 80 | 20 | 200.9 | 7 | 8.2 | 11.7 | 4½ | 22 | 36 | 24 hrs. |
| L | 8.15 | Soy 67 | 33 | 200.9 | 6 | 10.7 | | 4½ | 28 | 44 | 24 hrs. |
| M | 7.58 | Soy 100 | 0 | 186.8 | 6 | 4.6 | 13.9 | <7 | 14 | 22 | 3 days. |
| N | 7.58 | Soy 80 | 20 | 186.8 | 6½ | 6.9 | 23.2 | 6 | 22 | 34 | 13–14 days. |

It is evident from the above table that the inclusion of rosin speeds up the drying operation and improves the hardness. It also appears to improve the alkali resistance in some instances.

In some instances apparently a lower degree of esterification results in better resistance to commercial detergents than does a higher degree of esterification. A series of esters were prepared from an ortho-phenylphenol resin having a viscosity of 7.3 centistokes with soybean oil acids of Example 1. As shown in the table below the esters vary in degree of esterification from 50 to 80%. These esters were converted into pigmented metal primers by first converting the esters into a 70% non-volatile solution in mineral spirits and then grinding these solutions with pigments in a pebble mill to give a product having the following composition:

| | |
|---|---|
| Titanox RA | 175 |
| Lithopone | 175 |
| Lecithin | 4 |
| 70% ester solution | 385 |
| Mineral spirits | 255 |
| 6% manganese naphthenate | 3 |

Films of these materials were then applied to bonderized steel plate and baked at 300° F. for 30 minutes. The steel plates were then immersed in a 1% solution of a commercial household detergent (Tide) at 165° F. The panels were examined after the indicated intervals of testing with a score of 10 representing a perfect and unaffected panel. This test is to determine the utility of the primers for use on household washing machines. The results obtained are shown in the following table:

| Degree of Esterification | Rating of Primer | |
|---|---|---|
| | 402 hrs. | 1,200 hrs. |
| 50% | 9+ | 8 |
| 60% | 9+ | 6 |
| 70% | 9 | 5 |
| 80% | 10 | 4 |

It is evident from the table that the esters with a lower degree of esterification have greater stability against commercial detergents than do those of a higher degree of esterification. Comparable products esterified from 30 to 40% with the same fatty acids were rated at from 2 to 3 after immersion for approximately 1,000 hours.

While esters within the range of polymerizability index indicated above are useful, the preferred range of polymerizability index for the para-substituted resins may be different from that of the ortho-substituted resins. In general, the para-substituted resin esters tend to be more viscous, and accordingly, the products having polymerizability indices near the top of the range tend to be thermoplastic gels at room temperature, necessitating use of the esters at elevated temperatures. In contrast, the ortho-substituted resin esters having polymerizability indices near the top of the range are much less viscous and can be readily used in solution at room temperature. The ortho-substituted resin esters having low polymerizability indices display less alkali resistance than do comparable para-substituted resin esters. Thus in Example 2 a dehydrated castor oil acid ester having a polymerizability index of 360.0 had an alkali stability of 2 days; whereas in Example 15 a dehydrated castor oil acid ester having a polymerizability index of 366.6 had an alkali stability of 13 days. Furthermore, as will be seen from Example 6 wherein a soy acid ester having a polymerizability index of 214.0 and an alkali stability of 13 days, the alkali stability is more dependent upon the molecular weight of the resin than on the character of the fatty acid. Thus the molecular weight of Example 3 was relatively low as indicated by the viscosity of 5.12; whereas the resin of Example 6 was considerably higher as indicated by the viscosity of 8.73. Accordingly higher molecular weight resins are preferred for the ortho-substituted resins because of the increased alkali stability. In comparison, low molecular weight para-substituted resins are preferred because the esters of these resins demonstrate excellent alkali stability while avoiding high viscosities.

This application is a continuation-in-part of my co-pending application Serial No. 281,039 filed April 7, 1952, now abandoned, which in turn is a continuation-in-part of my co-pending application Serial No. 142,709 filed February 6, 1950, now patent No. 2,649,422.

I claim as my invention:

1. An ester of a resin selected from the group consisting of ortho- and para-phenylphenol-formaldehyde resins, the resin having been prepared from said phenol and formaldehyde as the sole reactants, in the presence of an acid catalyst, said resin being substantially free from monomeric phenol and lower molecular weight condensation products containing two phenolic nuclei, said resin having at least 50% of its hydroxyl groups esterified with acids selected from the group consisting of (1) unsaturated higher fatty acids containing from 8 to 22 carbon atoms and (2) mixtures of said unsaturated higher fatty acids with from 10–40% of rosin acids based on the total weight of the mixture, said ester being characterized by a polymerizability index of 100–600, said polymerizability index being the mathematical product of (a) the viscosity in centistokes at 30° C. of a 30% solution by weight of the resin in dimethyl formamide and (b) the viscosity in centistokes obtained on a bodied sample of the unsaturated fatty acids, said ester having an acid number below 20.

2. Product according to claim 1 in which the resin employed for esterification is substantially free from material vaporizable at 250° C. at 1–5 mm. of mercury absolute pressure.

3. Product according to claim 1 in which the resin employed for esterification is substantially free from material vaporizable at 310° C. at 1–5 mm. of mercury absolute pressure.

4. Product according to claim 1 in which the polymerizability index is between 140 and 560.

5. Product according to claim 1 in which the ester is substantially free from materials vaporizable at 260° C. at 1–5 mm. of mercury absolute pressure.

6. An unsaturated higher fatty acid ester of a para-phenylphenol-formaldehyde resin, the resin having been prepared from said phenol and formaldehyde as the sole reactants, in the presence of an acid catalyst, said resin being substantially free from monomeric phenol and lower molecular weight condensation products containing two phenolic nuclei, said resin having at least 50% of its hydroxyl groups esterified with unsaturated higher fatty acids containing from 8 to 22 carbon atoms, said ester being characterized by a polymerizability index of 100–600, said polymerizability index being the mathematical product of (a) the viscosity in centistokes at 30° C. of a 30% solution by weight of the resin in dimethyl formamide and (b) the viscosity in centistokes obtained on a bodied sample of the unsaturated fatty acids, said ester having an acid number below 20.

7. Product according to claim 6 in which the unsaturated higher fatty acids are derived from a semi-drying oil.

8. Product according to claim 6 in which the unsaturated higher fatty acids are derived from a drying oil.

9. An unsaturated higher fatty acid ester of an ortho-phenylphenol formaldehyde resin, the resin having been prepared from said phenol and formaldehyde as the sole reactants, in the presence of an acid catalyst, said resin being substantially free from monomeric phenol and lower molecular weight condensation products containing two phenolic nuclei, said resin having at least 50% of its hydroxyl groups esterified with unsaturated fatty acids containing from 8 to 22 carbon atoms, said ester being characterized by a polymerizability index of 100–600, said polymerizability index being the mathematical product of (a) the viscosity in centistokes at 30° C. of a 30% solution by weight of the resin in dimethyl formamide and (b) the viscosity in centistokes obtained on a bodied sample of the unsaturated fatty acids, said ester having an acid number below 20.

10. Product according to claim 9 in which the unsaturated higher fatty acids are derived from a semi-drying oil.

11. Product according to claim 9 in which the unsaturated higher fatty acids are derived from a drying oil.

12. Product according to claim 9 in which the ester is substantially free from materials vaporizable at 260° C. at 1–5 mm. of mercury absolute pressure.

13. Product according to claim 9 in which the ester is substantially free from materials vaporizable at 260° C. at 1–5 mm. of mercury absolute pressure.

14. Product according to claim 1 in which the resin has a viscosity of 4–20 centistokes and the unsaturated higher fatty acid has a viscosity of from 23–92 centistokes.

References Cited in the file of this patent

UNITED STATES PATENTS

| | | |
|---|---|---|
| 2,093,481 | Rosenblum | Sept. 21, 1937 |
| 2,124,285 | Bucherer | July 19, 1938 |
| 2,463,501 | Arvin | Mar. 8, 1949 |
| 2,608,538 | Aelony | Aug. 26, 1952 |
| 2,610,955 | De Groote et al. | Sept. 16, 1952 |
| 2,622,071 | Harrison | Dec. 16, 1952 |
| 2,649,422 | Aelony | Aug. 18, 1953 |